United States Patent [19]

Georg

[11] Patent Number: 4,945,651

[45] Date of Patent: Aug. 7, 1990

[54] APPARATUS FOR MEASURING LENGTH

[76] Inventor: Aigner Georg, D-8386 Thannenmais, Fed. Rep. of Germany

[21] Appl. No.: 292,645

[22] Filed: Dec. 29, 1988

Related U.S. Application Data

[63] Continuation of Ser. No. 940,550, Dec. 12, 1986, abandoned.

[30] Foreign Application Priority Data

Dec. 17, 1985 [DE] Fed. Rep. of Germany ....... 3544515

[51] Int. Cl.$^5$ .............................................. G01B 3/28
[52] U.S. Cl. ....................................... 33/832; 33/638; 33/626; 33/DIG. 1
[58] Field of Search ............. 33/169 R, 169 B, 172 E, 33/172 R, 170, 143 R, 143 LM, 147 R, 626, 628, 638, 640, 641, 529, 832, 833, 836, 838, 828, 533

[56] References Cited

U.S. PATENT DOCUMENTS

| | | | |
|---|---|---|---|
| 1,186,364 | 6/1910 | Allington | 33/170 N X |
| 1,346,572 | 7/1920 | Walter . | |
| 1,677,424 | 7/1928 | Allen . | |
| 1,942,118 | 1/1934 | Pignone | 33/169 R X |
| 2,280,437 | 4/1942 | Levesque | 33/DIG. 1 X |
| 2,444,136 | 6/1948 | Leasure | 33/167 X |
| 2,494,152 | 1/1950 | Ablett | 33/519 |
| 2,759,269 | 8/1956 | Haase et al. | 33/169 R |
| 2,855,687 | 10/1958 | Price | 33/838 |
| 2,910,779 | 11/1959 | Patton . | |
| 3,106,023 | 10/1963 | Wilson | 33/170 |
| 4,227,308 | 10/1980 | Talansky et al. | 33/169 B |
| 4,503,619 | 3/1985 | Nelsen et al. | 33/169 B X |

FOREIGN PATENT DOCUMENTS

| | | |
|---|---|---|
| 369503 | 2/1923 | Fed. Rep. of Germany . |
| 1448468 | 5/1973 | Fed. Rep. of Germany . |
| 441190 | 5/1941 | France . |
| 278632 | 2/1952 | Switzerland . |
| 143615 | 5/1920 | United Kingdom ................. 33/170 |
| 2066471 | 7/1981 | United Kingdom . |

OTHER PUBLICATIONS

Tesa Brochure—Kleiner Magnet-Messstander (1971).
Tesa Brochure—Messstander 40 mm (1971).
Tesa Brochure—Universal-Messstander (1971).

Primary Examiner—Harry N. Haroian
Attorney, Agent, or Firm—Cohen, Pontani & Lieberman

[57] ABSTRACT

An apparatus for measuring lengths, having a housing 10 which has a contact plane 20 as well as sensor pin 16 which is arranged and displaceable perpendicular thereto and is connected to an indicator instrument 28; the housing 10 having a single support foot 12 for the universal use of the instrument, the bottom of said support foot lying in the contact plane 20.

13 Claims, 3 Drawing Sheets

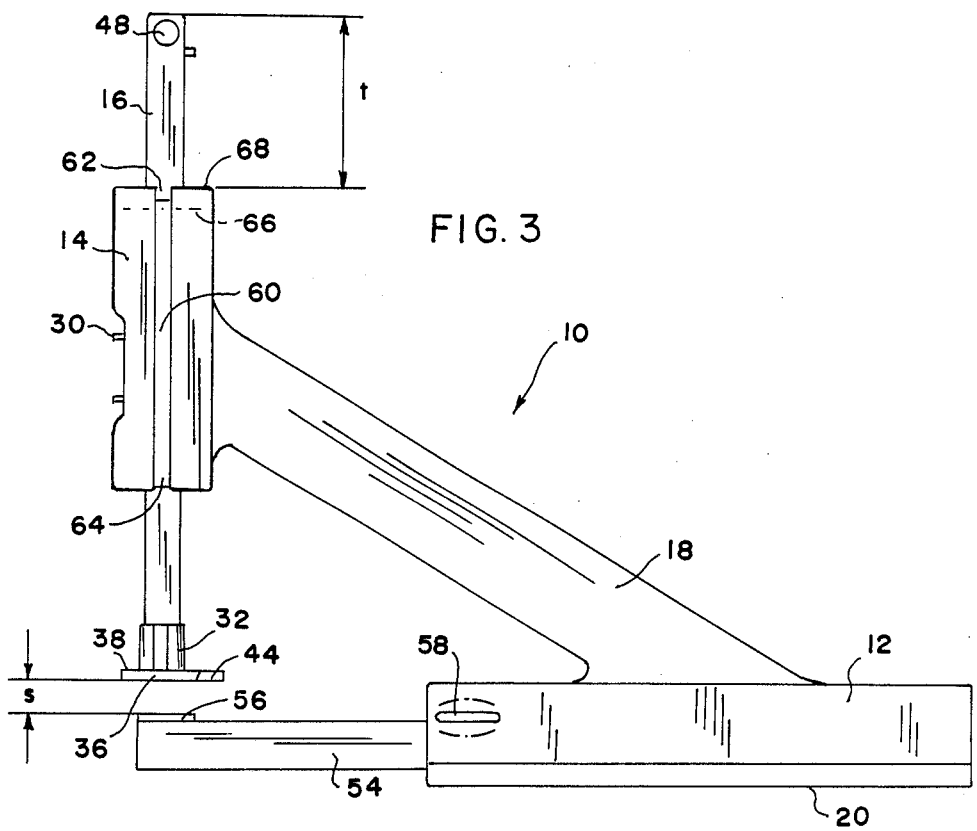
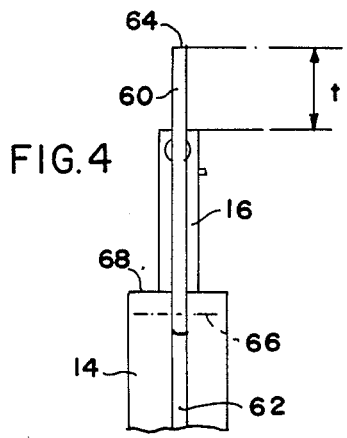
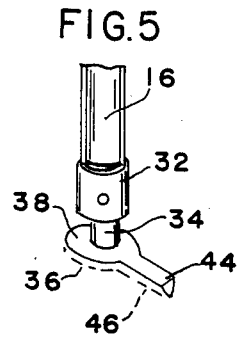

APPARATUS FOR MEASURING LENGTH

This is a continuation of U.S. patent application Ser. No. 940,550, filed Dec. 12, 1986 now abandoned.

TECHNICAL FIELD

The present invention relates to an apparatus for measuring lengths, having a housing which has a contact plane as well as a sensor pin which is arranged and displaceable perpendicular thereto and is connected with an indicating instrument.

BACKGROUND ART

Federal Republic of Germany Patent 19 46 052 describes and illustrates a measuring instrument of this type which is intended for use in the working of the wood surfaces or the like, in order for instance to adjust the mechanical working tools. For this purpose, the measurement instrument has two support feet the bottoms of which form the contact plane. In the center between the two support feet there is located the sensor pin which is displaceable axially against spring action. The sensor pin here actuates the indicating instrument which is connected via gearing to the sensor pin.

This known measuring instrument can only be used if the two support feet can come to rest on one and the same plane. In many cases of use however, this is not possible, for instance in the case of wood-milling cutters in which, in general, a stop having a fixed stop half and an adjustable stop half is provided. In actual practice, the operator, upon adjusting the milling tool, must then have recourse to test millings, which is disadvantageous not only because it means a loss of time and material but also because there is the danger of injuries since, in order to save time, the operator will not apply guard devices or covers during the test millings.

DISCLOSURE OF THE INVENTION

The object of the present invention is to provide a length measuring apparatus which is as universal in use as possible and which can be used even in cases in which a continuous contact plane is not available.

In accordance with the invention, this object is achieved with the apparatus of the aforementioned type in the manner that the housing has a single support foot the bottom of which lies in the contact plane.

The single support foot of such an instrument is applied against that contact plane the distance to which is to be measured by means of the sensor pin. In wood-working machines, this is for instance the stop which is adjustable relative to the tool.

As an advantageous further development of the invention, the support foot is provided, on at least one side, with a flat resting surface which extends at right angles to the contact plane. In this case it is particularly advantageous if the housing part which bears the sensor pin has another contact surface which lies in the plane of the contact surface of the support foot.

As a result of this further development, the measuring instrument can be placed on a well-defined contact plane, for instance on a machine table, and pressed with its support foot against a perpendicular contact surface, for instance the displaceable rest of a milling machine, in order to measure a horizontal distance in this way.

The universal use of the instrument is aided by the feature that the support foot bears a contact plate which is perpendicular to the sensor pin and displaceable under it. In this connection, it is favorable when the contact plate is fastened on the end of a support rail which can be inserted together with the contact plate into the support foot.

Due to this further development, the measuring instrument can be used also for the measuring of thicknesses, wall thicknesses or the like. If it is thereafter to serve, for instance, again for the adjustment of a working tool, it is merely necessary for the resting plate together with its support rail to be re-inserted into the support foot in order for it not to be in the way.

It is advantageous if the support foot is provided with magnetic holding means on its lower side. The holding means hold the measuring instrument on a metallic contact plane, for instance a machine table, in a well-defined position so that it stands firmly and cannot tilt despite the absence of a second support foot.

For a stable contact it is furthermore advantageous if at least on recess is provided in the bottom side of the support foot. In this way the area of the contact plane of the support foot is limited, as a result of which irregularities on the contact plane, for instance particles of dirt or chips on a machine table, interfere as little as possible with the precision of the measurement.

In accordance with another feature of the invention, the housing part which mounts the sensor pin is developed on its top side facing away from the contact plane as a flat contact surface parallel to the contact plane and the free end of the sensor pin extends out of said top side. In this way the instrument can also be used for depth measurements.

As a further development of the invention, the housing part which mounts the sensor pin bears a sensor rod parallel to which the sensor pin can be displaced. In this connection, the sensor rod can be mounted in the housing part in such a manner that it can be swung out.

In this further development of the invention, the instrument can also be used for measuring the depth of holes into which the sensor pin can no longer be introduced. Instead of the sensor pin, the sensor rod is inserted to the bottom of the hole and the depth of the hole is measured via the sensor pin.

In accordance with another feature of the invention, the sensor pin is provided on the end thereof facing the contact plane with a measurement stop disk from which a measurement extension having measurement tip directed towards the contact plane protrudes. With this measurement tip it is possible to measure grooves or the like. Thereby, the cross-section of the measurement extension can have the shape of a relatively acute-angled triangle.

Further features and advantages of the invention will become apparent from the claims and from the following description of an illustrative embodiment, shown in the drawings.

DESCRIPTION OF THE DRAWINGS

FIG. 3 is a rear side view of the measuring instrument;

FIG. 4 is a partial view of the upper end of the part of the housing which mounts the sensor pin, with the sensor rod swung out; and FIG. 5 is a partial perspective view of the lower end of the sensor pin with the measurement stop disk.

DETAILED DESCRIPTION OF ONE EMBODIMENT OF THE INVENTION

Figure 1:
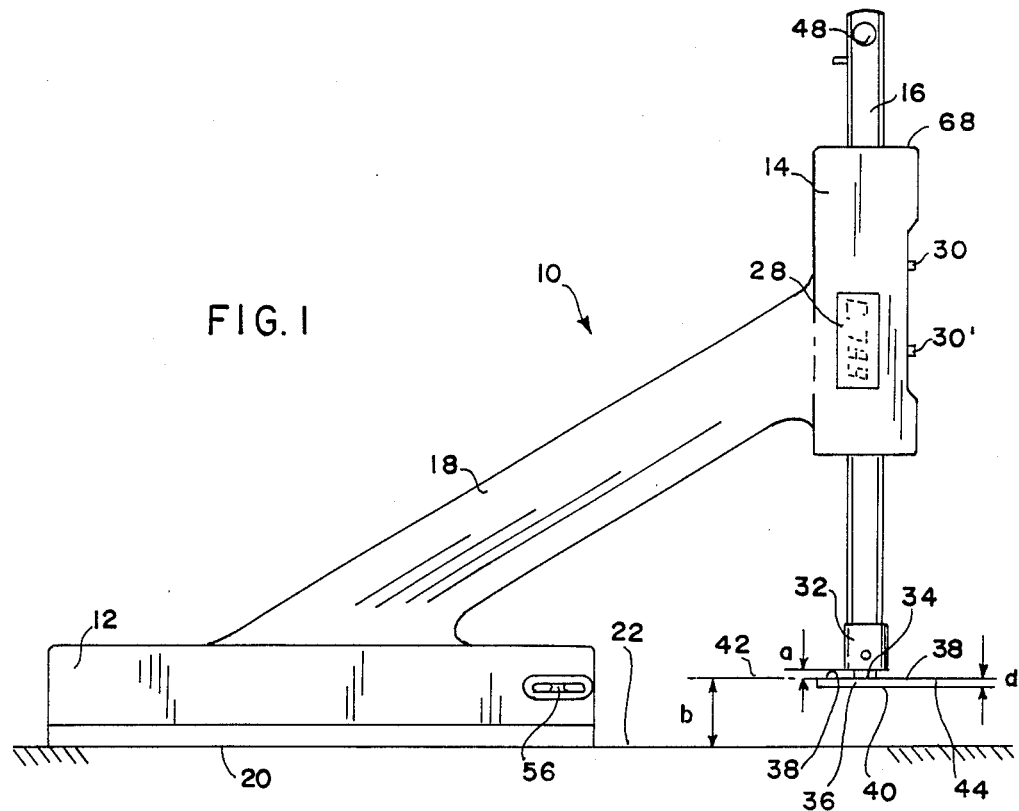
FIG. 1 is a side view of a length-measuring instrument.

The instrument for measuring lengths which is shown in the figures has a housing 10 with a support foot 12 and a housing part 14 which bears a sensor pin 16 which is mounted for longitudinal displacement in it. The support foot 12 and the housing part 14 are arranged with their lengthwise directions at right angles to each other and are connected to each other by an obliquely extending straight grip strap 18. Of course, the grip strap may also be of other shape.

The bottom side of the support foot 12 forms a contact plane 20 via which the measurement instrument can be placed on a reference surface 22, for instance a machine table. In order to increase the stability of the instrument, holding magnets 24 are inserted in the bottom of the support foot 12, the magnets holding the housing 10 reliably on a metal reference surface (22) without fear of tilting. Furthermore, the bottom of the support foot 12 has a recess 26 in it, said recess extending in the longitudinal direction of the support foot 12 and making the surface of the contact plane 20 of the support foot 12 as small as possible. This way disturbing influences of unevennesses, particles of dirt or the like are kept as small as possible.

Within the housing part 14 there is installed an electronic length measuring device with a digital display instrument 28 which displays the movement of displacement of the sensor pin 16 which is developed as a flat strip. By means of a push-button 30 the display of the display instrument 28 can be set to zero in every position of the sensor pin 16. It is also possible to select either a metric display or an inch display by means of another push-button 30'.

At the lower end of the sensor pin 16 which faces the contact plane 20 and thus the reference surface 22 there is fastened a cylindrical mounting member 32 within which a carrier pin 34 is mounted for movement in the direction of displacement of the sensor pin 16. At the free end of the carrier pin 34 there is fastened a measurement stop disk 36, the thickness of which is indicated as "d" in FIG. 1. The axial play a by which the carrier pin 34 is movable within the mounting member 32 corresponds precisely to this thickness d of the measurement stop disk 36 so that both the top side 38 of said disk and its bottom side 40 can be used as a reference plane 42 for measuring a distance b.

As can be noted in particular from FIG. 5, an elongated measurement extension 44 protrudes from the measurement stop disk 36, said extension having a measurement tip 46 pointing towards the contact plane 20 and having a cross-section in the shape of a triangle. The measurement tip 46 lies here in the plane of the bottom 40 of measurement stop disk 36 while the top 38 of the measurement stop disk 36 passes continuously into the top of the measurement extension 44. By means of this measurement extension 44, tool profiles, grooves, depths of threads or the like into which the measurement stop disk 36 cannot be introduced are measured.

The carrier pin 34 which bears the measurement stop disk 36 and its measurement extension 44 is mounted for free rotation in the mounting member 32 so that the measurement extension 44 can be turned in any desired direction.

The sensor pin 16 is provided on both sides of its upper end facing away from the contact plane 20 with a round grip recess 48 so that it can be easily gripped between two fingers and displaced.

Figure 2:
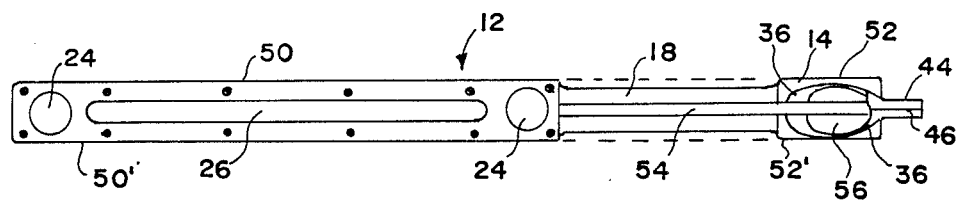
FIG. 2 is a bottom view of the measuring instrument.
Figure 6:
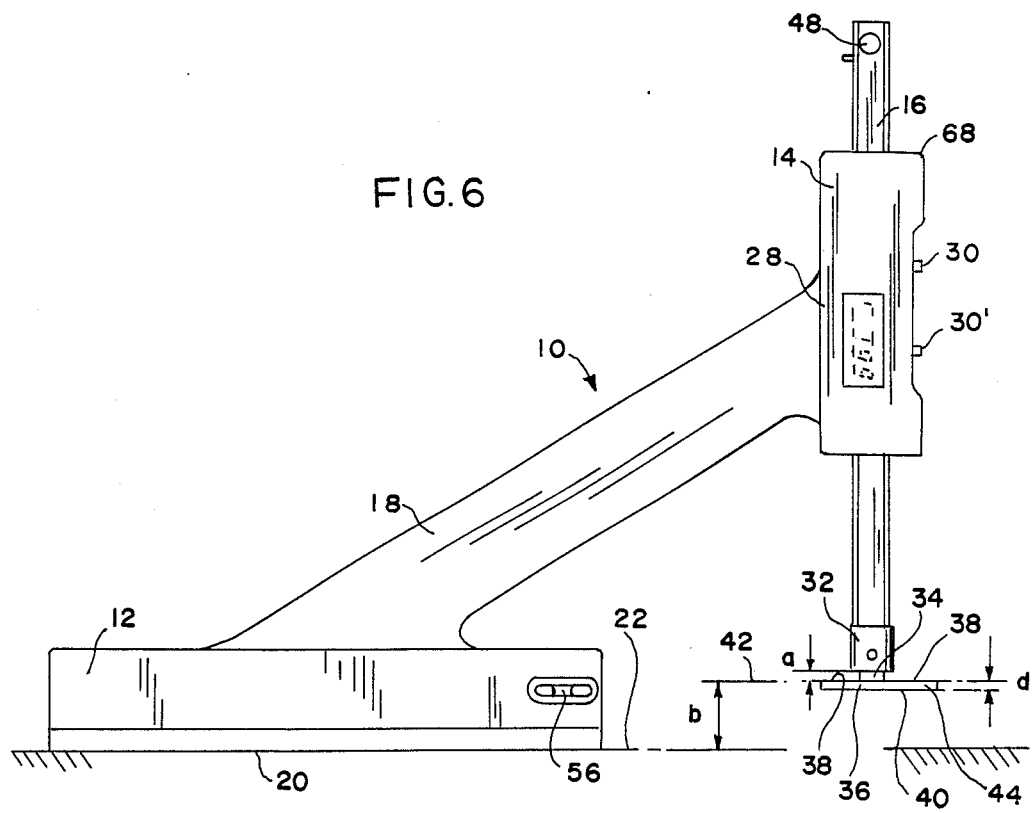

As shown in particular in FIG. 2, both the support foot 12 and the housing part 14 are of approximately parallelepiped shape. The support foot 12 has on both of its sides a flat contact surface 50, 50' which extend at a right angle to the contact plane 20. The housing part 14 also has two such contact surfaces 52, 52' which lie in the corresponding plane of the corresponding contact surface 50 of the support foot 12. This allows the measuring instrument to be placed in a well-defined position also on a reference surface, for instance a machine table, in order then to measure the distance b from a surface which is arranged at right angles to said reference surface by means of the sensor pin 16.

Within the support foot 12 a support rail 54 is mounted for displacement in the lengthwise direction of the support foot 12, said rail bearing at its free end, on the side facing the measurement stop disk 36, a contact plate 56. The support rail 54 can be extended so far out of the support foot 12 that the contact plate 56 is located below the measurement stop disk 36. This position has been shown in FIGS. 2 and 3. FIG. 3 shows that a thickness s, for instance a wall-thickness or a diameter, can then be measured with the measuring instrument.

After the conclusion of this measurement, the support rail 54 is again pushed back into the support foot (12) until the resting plate (56) is also recessed in the support foot 12. In order to facilitate the pulling of the contact plate 56 out of the support foot 12, the latter is provided on each of its sides with a grip recess 58 through which the contact plate 56 can be grasped.

The free end of the sensor pin 16 extends out of the top of the housing part 14 which faces away from the contact plane 20. Said top part is developed as a flat contact surface 68 which extends parallel to the contact plane 20. In this way, depth measurements 1 can be made with the use of the free end of the sensor pin 16, the contact surface 68 being the fixed reference plane. (FIG. 3)

FIGS. 3 and 4 show that the housing part 14 bears a sensor rod 60 which extends parallel to the sensor pin 16 and in its position of rest shown in FIG. 3 is recessed in a slot 62 in the housing part 14 so that it does not protrude either beyond the contact surface 68 or beyond the adjacent contact surface 52. In order to bring the sensor rod 60 into its measurement position it can be grasped at its lower end 64 and swung by means of its upper end around an axis 66 which extends parallel to the contact plane 20 until, in its swung out end-position shown in FIG. 4, it is again parallel to the sensor pin 16. In this position, the measuring instrument can be used to measure the depth t of a blind hole. For this purpose, the free end 64 of the sensor rod 60 is inserted all the way to the bottom of the hole whereupon the depth t can be determined by means of the sensor pin 16.

We claim:

1. An apparatus for measuring length comprising: a single, substantially parallelepiped-shaped support foot (12) being elongated in a direction and having a first end and a second end, and an elongated contact plane (20) between said first end and said second end; a substantially parallelepiped-shaped housing (14) extending perpendicular to said support foot and said direction; and a grasping strip (18) connecting said support foot to said housing; and a sensor pin (16) housed in the housing (14) and being displaceable perpendicularly to the contact plane and remote from said support foot;

said contact plane forming the bottom of said support foot (12) for contact with an object as reference surface for measurement between said contact plane (20) and said displaceable sensor pin (16); the support foot (12) having, on at least one side thereof, a flat contact surface (50) extending transversely to the contact plane (20); and the housing (14) bearing the sensor pin (16) having a contact surface (52) coplanar with the contact surface (50) of the support foot (12) so that said measuring apparatus is supportable on a flat planar reference surface with said flat contact surface (50) of the support foot (12) and said contact surface (52) of the housing (14) in stable and flatly supported abutment on the reference surface.

2. The apparatus according to claim 1, further comprising a contact plate (56) connected to the support foot (12) and displaceable at right angles to the sensor pin (16) and beneath it.

3. The apparatus according to claim 2, further comprising a support rail (54) connected to the contact plate at the end thereof; the support rail being insertable together with the contact plate (56) into support foot (12).

4. The apparatus according to claim 1, further comprising magnetic holding means (24) located on the bottom of the support foot (12).

5. The apparatus according to claim 1, wherein at least one recess (26) is provided in the bottom of the support foot (12).

6. The apparatus according to claim 1, wherein the housing part (14) which contains the sensor pin (16) has on its top side facing away from the contact plane (20), a contact surface (68) which is parallel to the contact plane (20), and wherein the free end of the sensor pin (16) extends from said top side.

7. The apparatus according to claim 1, wherein the housing part (14) which contains the sensor pin (16) bears a sensor rod (60) relative to which the sensor pin (16) is parallelly displaceable.

8. The apparatus according to claim 7, wherein the sensor rod (60) is mounted within the housing part (14) in such a manner that it can be swung out.

9. The apparatus according to claim 1, further comprising a measurement stop disk (36) connected to the sensor pin (16) at its end facing the contact plane (20); and a measurement extension (44) having a measurement tip (46) pointing towards the contact plane (20) protruding from the stop disk (36).

10. The apparatus according to claim 1, wherein the measurement stop disk (36) is mounted to the sensor pin (16) with an axial play (a) which corresponds to the thickness (b) of the measurement stop disk (36).

11. The apparatus according to claim 1, wherein the sensor pin (16) has a grasping recess (48) on the end thereof facing away from the contact plane (20).

12. The apparatus according to claim 1, further comprising an indicating instrument (28) operatively connected to the sensor pin (16).

13. The apparatus according to claim 12, wherein the indicating instrument (28) together with the sensor pin (16) mounted displaceably on it are developed as an electronic measurement slide with digital reading.

* * * * *